United States Patent
Li et al.

(10) Patent No.: US 12,384,231 B2
(45) Date of Patent: Aug. 12, 2025

(54) COAXIAL ELECTRIC DRIVE AXLE AND AUTOMOBILE

(71) Applicant: TOP GEAR POWERTRAIN TECHNOLOGY CO., LTD, Shanghai (CN)

(72) Inventors: Shan Li, Shanghai (CN); Yueyue Deng, Shanghai (CN); Haifeng Lu, Shanghai (CN); Jie Zhang, Shanghai (CN)

(73) Assignee: TOP GEAR POWERTRAIN TECHNOLOGY CO., LTD, Shanghai (CN)

( * ) Notice: Subject to any disclaimer, the term of this patent is extended or adjusted under 35 U.S.C. 154(b) by 3 days.

(21) Appl. No.: 17/921,170

(22) PCT Filed: Jun. 7, 2022

(86) PCT No.: PCT/CN2022/097259
§ 371 (c)(1),
(2) Date: Oct. 25, 2022

(87) PCT Pub. No.: WO2023/206719
PCT Pub. Date: Nov. 2, 2023

(65) Prior Publication Data
US 2024/0217326 A1     Jul. 4, 2024

(30) Foreign Application Priority Data

Apr. 25, 2022 (CN) .......................... 202210440306.3

(51) Int. Cl.
*B60K 1/00*     (2006.01)
*B60K 17/16*    (2006.01)
*B60K 23/04*    (2006.01)

(52) U.S. Cl.
CPC .............. *B60K 1/00* (2013.01); *B60K 17/165* (2013.01); *B60K 23/04* (2013.01); *B60K 2001/001* (2013.01); *B60K 2023/043* (2013.01)

(58) Field of Classification Search
CPC ........... F16H 48/24; F16H 48/34; F16H 48/20
See application file for complete search history.

(56) References Cited

U.S. PATENT DOCUMENTS 1,332,535 A  *  3/1920  Baker ..................... F16H 48/30
                                                           475/230

FOREIGN PATENT DOCUMENTS

CA     2548815 A1    4/2003
CA     2561052 A1    3/2007
(Continued)

OTHER PUBLICATIONS

CN111365425.*
(Continued)

*Primary Examiner* — Derek D Knight
(74) *Attorney, Agent, or Firm* — IPRO, PLLC

(57) ABSTRACT

The present disclosure discloses a coaxial electric drive axle and an automobile, the coaxial electric drive axle includes a motor, at least one transmission assembly, a main shaft, and a first half shaft and a second half shaft connected by a differential; each transmission assembly includes at least two sliding sleeve shifting mechanisms, at least one of the sliding sleeve shifting mechanisms is arranged on the housing of the differential, and at least one of the sliding sleeve shifting mechanisms is arranged on the main shaft; the motor, the main shaft, the first half shaft and the second half shaft have one same axis. The three modules are arranged coaxially, the structure layout is novel and compact, the power transmission chain is short, and the transmission efficiency is high.

16 Claims, 4 Drawing Sheets

(56) References Cited

FOREIGN PATENT DOCUMENTS

| | | | |
|---|---|---|---|
| CN | 106427551 A | | 2/2017 |
| CN | 106740019 A | | 5/2017 |
| CN | 110182036 A | | 8/2019 |
| CN | 110345222 A | | 10/2019 |
| CN | 110513447 A | | 11/2019 |
| CN | 209756788 U | | 12/2019 |
| CN | 210852020 U | | 6/2020 |
| CN | 111365425 A | * | 7/2020 |
| CN | 212332298 U | | 1/2021 |
| CN | 113085520 A | | 7/2021 |
| EP | 3984797 A1 | | 4/2022 |

OTHER PUBLICATIONS

PCT/CN2022/097259 International Search Report.
Foreign Office Action 1 dated Aug. 25, 2022, for CN 202210440306. 3.
Foreign Office Action 2 dated Sep. 19, 2022, for CN 202210440306. 3.

* cited by examiner

COAXIAL ELECTRIC DRIVE AXLE AND AUTOMOBILE

FIELD OF THE INVENTION

The present disclosure relates to the technical field of vehicles, in particular to a coaxial electric drive axle and an automobile.

BACKGROUND OF THE INVENTION

Electric drive axle with motor(s) and three-speed transmission is a support structure of the three-speed transmission and the motor. The transmission system is an important part of the electric drive axle, which can carry out the power output by the shifting and drive the movement and operation of the vehicle or other transportation machinery. To ensure the operating capacity and operating efficiency of the vehicle under various working conditions, it is necessary to ensure that the power outputs to the vehicle under different working conditions are also diverse, so that the vehicle can obtain a certain speed, sufficient traction and high efficiency. With the continuous development of science and technology, people have higher and higher requirements for the manufacturing process of the electric drive axle with motor and three-speed transmission.

The existing electric drive axles in the market have certain drawbacks in use. First, most electric drive axle systems on the market now have a single speed ratio, which can only provide a single power flow mode, and cannot take into account speed and traction at the same time. Only one speed ratio and only one power flow are not conducive to people's use. In addition, most of the electric drive axles on the market are large in structure and large in unsprung mass, which affects the reliability and driving comfort of the vehicle, and has some negative effects on the use process. For this reason, we propose a coaxial single-motor three-speed transmission electric drive axle for new energy commercial vehicles.

SUMMARY OF THE INVENTION

In view of the deficiencies of the prior art, the present disclosure provides a coaxial electric drive axle and an automobile, which minimizes the energy consumption of the vehicle operation. The electric drive axle can realize various power output modes, and can flexibly respond to various application conditions of the vehicle, which can effectively solve the problems mentioned in the background of the invention.

In order to achieve the above purpose, the technical solution adopted in the present disclosure is to provide a coaxial electric drive axle, which includes a motor, at least one transmission assembly, a main shaft, and a first half shaft and a second half shaft connected by a differential; the main shaft is fixedly connected with the housing of the differential, and the main shaft is sleeved on at least a part of the first half shaft and the second half shaft; the motor is connected to a corresponding transmission assembly in a transmission way; when the coaxial electric drive axle is in a transmission mode, each of the transmission assemblies is connected to the main shaft or the housing of the differential in a transmission way;

each of the transmission assemblies comprises at least two sliding sleeve (dog-clutch) shifting mechanisms, at least one of the sliding sleeve shifting mechanisms is arranged on the housing of the differential, and at least one of the sliding sleeve shifting mechanisms is arranged on the main shaft; and the motor, the main shaft, the first half shaft and the second half shaft have one same axis.

Preferably, a rotor of the motor has a through hole for the main shaft to pass through.

Preferably, each of the transmission assemblies comprises at least three gear pairs; when the coaxial electric drive axle is in a first transmission mode, the sliding sleeve shifting mechanism arranged on the housing of the differential is connected to a corresponding gear pair in a transmission way;

when the coaxial electric drive axle is in a second transmission mode, the sliding sleeve shifting mechanism arranged on the main shaft is connected to a corresponding gear pair in a transmission way; and when the coaxial electric drive axle is in a neutral mode, the transmission between each of the sliding sleeve shifting mechanisms and the corresponding gear pair is disconnected.

Preferably, there are two transmission assemblies, and the two transmission assemblies are symmetrically arranged on both sides of the main shaft.

Preferably, each of the transmission assemblies comprises a countershaft and at least three gear pairs, the countershaft comprises a first countershaft and a second countershaft, and at least one of the gear pairs is used for connecting the motor with the countershaft in a transmission way;

when the coaxial electric drive axle is in the first transmission mode, at least two gear pairs are used for connecting the countershaft with the housing of the differential in a transmission way; and when the coaxial electric drive axle is in the second transmission mode, at least one gear pair is used for connecting the countershaft with the main shaft in a transmission way.

Preferably, each of the gear pairs comprises a first gear arranged on the countershaft and a second gear arranged on the main shaft or the housing of the differential, each first gear meshes with a corresponding second gear.

Preferably, each second gear is arranged on the housing of the differential or the main shaft through a bearing.

Preferably, the coaxial electric drive axle further comprises a control unit electrically connected with the sliding sleeve shifting mechanism, the control unit is used for controlling the sliding sleeve shifting mechanism arranged on the housing of the differential to be connected with corresponding gear pair in a transmission way in the first transmission mode, controlling the sliding sleeve shifting mechanism arranged on the main shaft to be connected with corresponding gear pair in a transmission way in the second transmission mode; and controlling each sliding sleeve shifting mechanism to disconnect the transmission with corresponding gear pair in the neutral mode.

In order to overcome the disadvantages in the prior art, the present disclosure further provides an automobile, comprising the above mentioned coaxial electric drive axle.

Compared with the prior art, the present disclosure provides a coaxial electric drive axle and an automobile, and has the following beneficial effects: the motor transmits power to the first half shaft and the second half shaft through the transmission assembly, and the motor, the main shaft and the two half shafts are coaxially arranged, such that the structure layout is novel and compact, the power transmission chain is short, and the transmission efficiency is high. There are only two-stage power transmission in the three speeds, and the transmission efficiency reaches more than 95%, which minimizes the energy consumption of the vehicle operation. 3-speed shift can be realized, so that the electric drive axle can realize a variety of power output modes, and can flexibly respond to various application conditions of the vehicle.

DETAILED DESCRIPTION OF THE INVENTION

Figure 1:
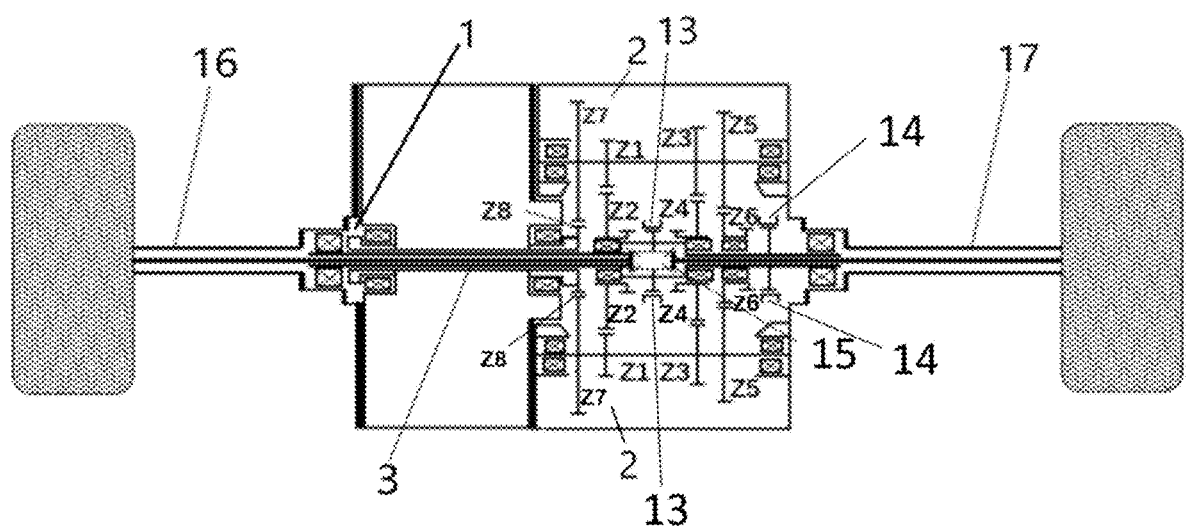
FIG. 1 is a schematic structural diagram of an overall structure of a coaxial electric drive axle according to an embodiment of the present disclosure.

The technical solutions of the present disclosure will be clearly and completely described below with reference to the accompanying drawings and specific embodiments, but those skilled in the art will understand that the embodiments described below are part of the embodiments of the present disclosure, rather than all of the embodiments, and it is only used to illustrate the present disclosure and should not be considered as limiting the scope of the present disclosure. Based on the embodiments of the present disclosure, all other embodiments obtained by those skilled in the art without creative efforts shall fall within the protection scope of the present disclosure. If there is no specific condition in the embodiments, it is carried out according to conventional conditions or the conditions suggested by the manufacturers. The reagents or instruments used without the manufacturer's indication are conventional products that can be purchased from the market.

In the description of the present disclosure, it should be noted that the orientations or positional relationships indicated by the terms such as "center", "upper", "lower", "left", "right", "vertical", "horizontal", "inner" and "outer" are based on the orientations or positional relationships shown in the accompanying drawings, which are only for the convenience of describing the present disclosure and simplifying the description, rather than indicating or implying that the indicated device or element must have a specific orientation or be constructed and operated in a specific orientation, and therefore should not be considered as a limitation to present disclosure. Furthermore, the terms "first", "second" and "third" are used for descriptive purposes only and should not be considered to indicate or imply relative importance.

In the description of the present disclosure, it should be noted that, unless expressly specified and limited otherwise, the terms "install", "connect" and "connect to" should be understood broadly, for example, they may be a fixed connection or a detachable connection, or an integral connection; they may be a mechanical connection, or may be an electrical connection; they may be a direct connection, or may be an indirect connection through an intermediate medium, or may be an internal communication between two elements. For those skilled in the art, specific meanings of the above terms in the present disclosure can be understood according to specific conditions.

As shown in FIGS. 1-6, a coaxial electric drive axle includes a motor 1, at least one transmission assembly 2, a main shaft 3, and a first half shaft 16 and a second half shaft 17 connected by a differential 15;

the main shaft 3 is fixedly connected with the housing of the differential 15, and the main shaft 3 is sleeved on at least a part of the first half shaft 16 and the second half shaft 17;

the motor 1 is connected to the corresponding transmission assembly 2 in a transmission way;

when the coaxial electric drive axle is in a transmission mode, each transmission assembly 2 is connected to the main shaft 3 or the housing of the differential 15 in a transmission way;

each transmission assembly 2 includes at least two sliding sleeve shifting mechanisms which include a first sliding sleeve shifting mechanism 13 and a second sliding sleeve shifting mechanism 14, and at least one sliding sleeve shifting mechanism is arranged on the housing of the differential 15, and at least one sliding sleeve shifting mechanism is arranged on the main shaft 3;

the motor 1, the main shaft 3, the first half shaft 16 and the second half shaft 17 have one same axis.

When the coaxial electric drive axle is in the transmission mode, the motor 1 drives the main shaft 3 to rotate, the transmission assembly 2 realizes power transmission through the main shaft 3 or the differential 15, and the sliding sleeve shifting mechanisms of the transmission assembly 2 realize the power transmission of each speed. And then, the motor 1 transmits power to the first half shaft 16 and the second half shaft 17 through the transmission assembly 2, and finally transmits to the wheels. The motor 1, the main shaft 3, the first half shaft 16 and the second half shaft 17 have the same axis, such that the structure is compact, the power transmission chain is short, and the transmission efficiency is high.

Further, a rotor of the motor 1 has a through hole for the main shaft 3 to pass through so as to drive the main shaft 3. Each transmission assembly 2 includes at least three gear pairs. When the coaxial electric drive axle is in a first transmission mode, the sliding sleeve shifting mechanism arranged on the housing of the differential 15 is connected to a corresponding gear pair in a transmission way.

When the coaxial electric drive axle is in a second transmission mode, the sliding sleeve shifting mechanism arranged on the main shaft 3 is connected to a corresponding gear pair in a transmission way. When the coaxial electric drive axle is in a neutral mode, each sliding sleeve shifting mechanism disconnects the transmission with corresponding gear pair. There are two transmission assemblies 2. The two transmission assemblies 2 are symmetrically arranged on both sides of the main shaft 3. Each transmission assembly 2 includes a countershaft and at least three gear pairs, and the countershaft includes a first countershaft 11 and a second countershaft 12. At least one gear pair is used for connecting the motor 1 and the countershaft in a transmission way. When the coaxial electric drive axle is in the first transmission mode, at least two gear pairs are used for connecting the countershaft with the housing of the differential 15 in a transmission way. When the coaxial electric drive axle is in the second transmission mode, at least one gear pair is used for connecting the countershaft with the main shaft 3 in a transmission way, and each gear pair includes a first gear arranged on the countershaft, and a second gear arranged on the main shaft 3 or the housing of the differential 15. Each first gear meshes with a corresponding second gear, and each second gear is arranged on the housing of the differential 15 casing or the main shaft 3 through a bearing, which has a novel and compact structure and layout, a short power transmission chain, and a high transmission efficiency. Power is transmitted through two stages only in all three speeds, and the transmission efficiency reaches more than 95%, which minimizes the energy consumption of vehicle operation. By achieving 3 shifting speeds, the electric drive axle can realize a variety of power output modes, and can flexibly respond to various application conditions of the vehicle, especially suitable for commercial vehicles with a wide range of load fluctuations and various and complex working conditions.

Further, the coaxial electric drive axle also includes a control unit being electrically connected to the sliding sleeve shifting mechanism. The control unit is used to control the sliding sleeve shifting mechanism arranged on the housing of the differential 15 to connect to corresponding gear pair in a transmission way in the first transmission mode, control the sliding sleeve shifting mechanism arranged on the main shaft 3 to connect to corresponding gear pair in a transmission way in the second transmission mode, and control each sliding sleeve shifting mechanism to disconnect the transmission with corresponding gear pair in the neutral mode.

Figure 2:
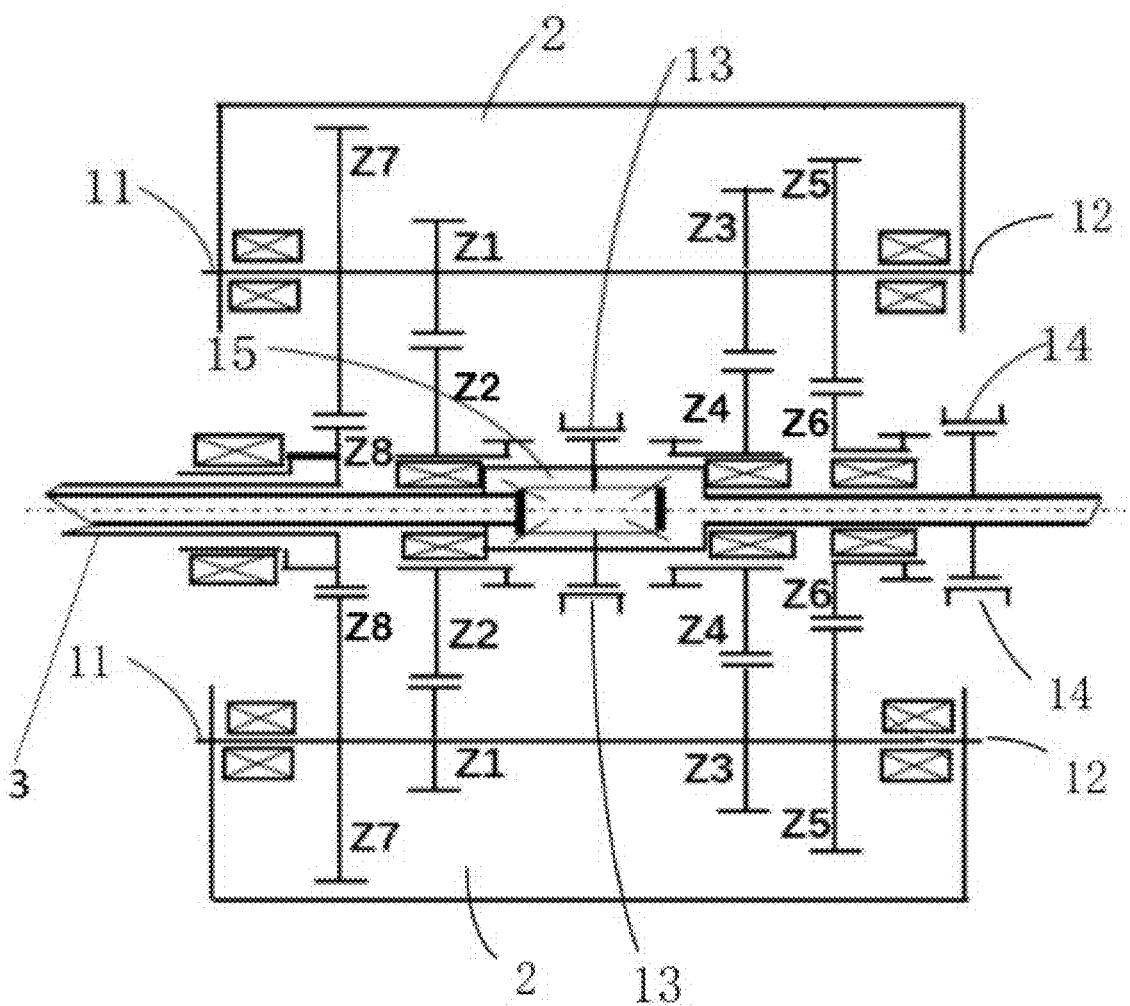
FIG. 2 is a schematic structural diagram of a transmission assembly in a coaxial electric drive axle according to an embodiment of the present disclosure.

Specifically in this embodiment:

As shown in FIGS. 1-2, the coaxial electric drive axle includes a motor 1, a transmission assembly 2, a main shaft 3, and a first half shaft 16 and a second half shaft 17 connected by a differential 15; the main shaft 3 and the housing of the differential 15 are fixedly connected, and the two ends of the main shaft 3 are respectively sleeved on the first half shaft 16 and the second half shaft 17; the motor 1 is connected to corresponding transmission assembly 2 in a transmission way.

The transmission assembly 2 includes two sliding sleeve shifting mechanisms, namely, a first sliding sleeve shifting mechanism 13 and a second sliding sleeve shifting mechanism 14. The first sliding sleeve shifting mechanism 13 is arranged on the housing of the differential 15, and the second sliding sleeve shifting mechanism 14 is arranged on the main shaft 3. The motor 1, the main shaft 3, the first half shaft 16 and the second half shaft 17 have the same axis, and the rotor of the motor 1 has a through hole for the main shaft 3 to pass through so as to drive the main shaft 3. Each transmission assembly 2 includes three gear pairs; the three gear pairs are: a first gear pair including a gear I Z1 and a gear II Z2, a second gear pair including a gear III Z3 and a gear IV Z4, and a third gear pair including a gear V Z5 and a gear VI Z6.

As shown in FIGS. 1-5, the power of the motor 1 is transmitted to a gear VIII Z8 through a rotor shaft, and is transmitted to a first countershaft 11 and a second countershaft 12 through a gear VII Z7 respectively, and then transmitted to the gear I Z1, the gear III Z3 and the gear V Z5 arranged on the two shafts. When the first sliding sleeve shifting mechanism 13 and the second sliding sleeve shifting mechanism 14 do not slide, there is no power transmission output; when the second sliding sleeve shifting mechanism 14 is in a neutral position, and the first sliding sleeve shifting mechanism 13 slides to the gear II Z2, the power outputs in a first shifting speed formed by the gear I Z1 and the gear II Z2; when the second sliding sleeve shifting mechanism 14 is still in the neutral position, and the first sliding sleeve shifting mechanism 13 slides to the gear IV Z4, the power outputs in a second shifting speed formed by the gear III Z3 and the gear IV Z4; and when the first sliding sleeve shifting mechanism sleeve 13 is still in the neutral position, and the second sliding sleeve shifting mechanism 14 slides to the gear VI Z6, the power outputs in a third shifting speed formed by the gear V Z5 and the gear VI Z6. The power of the power transmission route in each shifting speed will be transmitted to the first half shaft 16 and the second half shaft 17, and finally transmitted to the wheels to realize motor power drive.

Figure 3:
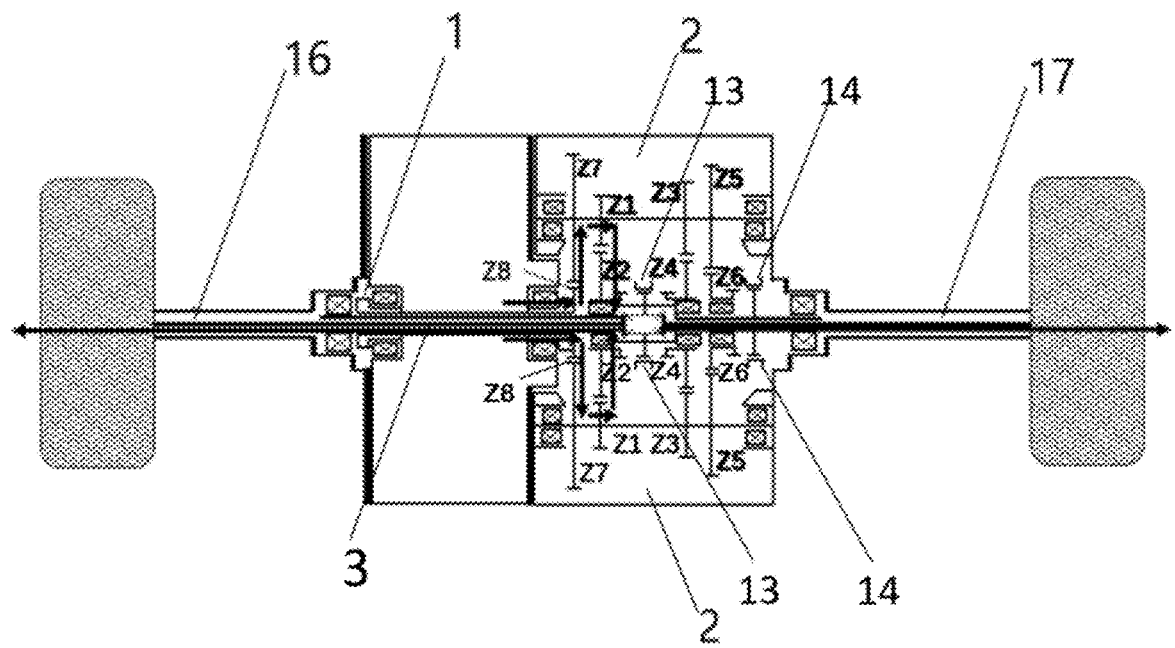
FIG. 3 is a schematic structural diagram of a first shifting speed power transmission in a coaxial electric drive axle according to an embodiment of the present disclosure.

Specifically, referring to the power transmission route map in the first shifting speed shown in FIG. 3, in this shifting speed, the power input by the motor 1 passes in the first shifting speed formed by the gear VIII Z8, the gear VII Z7, the first countershaft 11, the second countershaft 12, the gear I Z1, and the gear II Z2 of the transmission assembly 2, and then is transmitted to the differential 15 through the first sliding sleeve shifting mechanism 13, and then is output to the wheels through the first half shaft 16 and the second half shaft 17.

Figure 4:
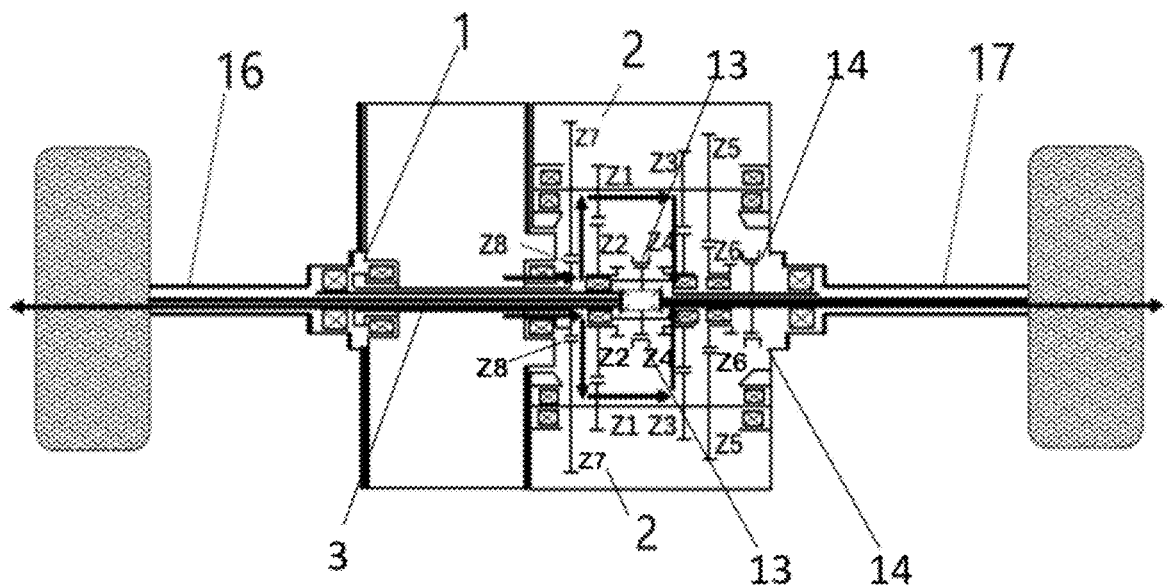
FIG. 4 is a schematic structural diagram of a second shifting speed power transmission in a coaxial electric drive axle according to an embodiment of the present disclosure.

Referring to the power transmission route map in the second shifting speed shown in FIG. 4, in this shifting speed, the power input by the motor 1 passes in the second shifting speed formed by the gear VIII Z8, the gear VII Z7, the first countershaft 11, the second countershaft 12, the gear III Z3 and the gear IV Z4 of the transmission assembly 2, and then is transmitted to the differential 15 through the first sliding sleeve shifting mechanism 13, and then is output to the wheels through the first half shaft 16 and the second half shaft 17.

Figure 5:
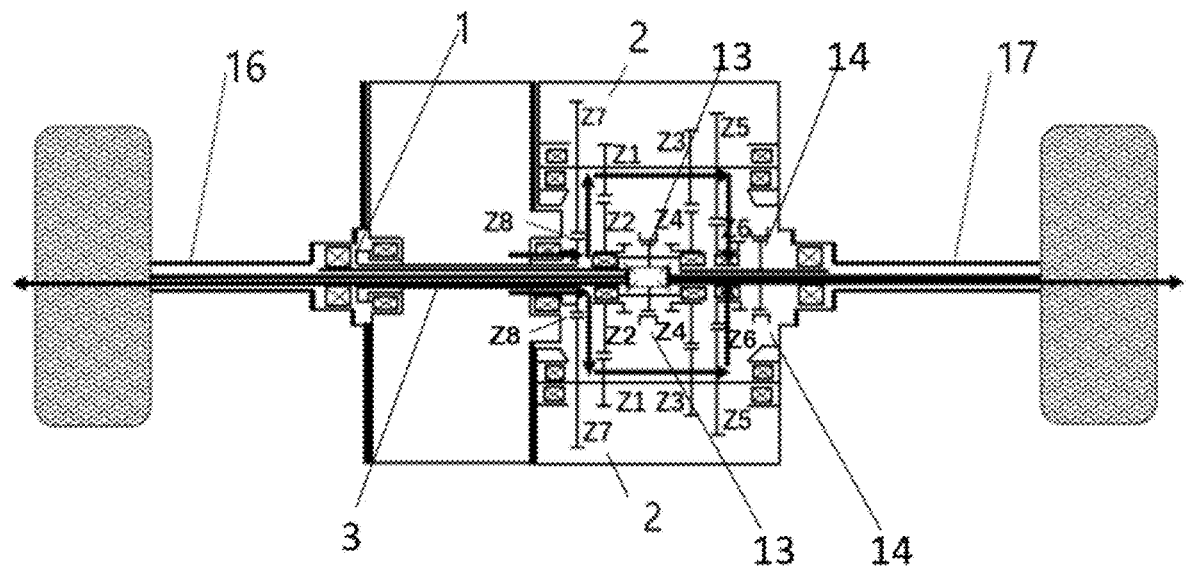
FIG. 5 is a schematic structural diagram of a third shifting speed power transmission in a coaxial electric drive axle according to an embodiment of the present disclosure.

Referring to the power transmission route map in the third shifting speed shown in FIG. 5, in this shifting speed, the power input by the motor 1 passes in the third shifting speed formed by the gear VIII Z8, the gear VII Z7, the first countershaft 11, the second countershaft 12, the gear V Z5 and the gear VI Z6 of the transmission assembly 2, and then is transmitted to the differential 15 through the second sliding sleeve shifting mechanism 14, and then is output to the wheels through the first half shaft 16 and the second half shaft 17. When the coaxial electric drive axle is in the neutral mode, each sliding sleeve shifting mechanism disconnects the transmission with corresponding gear pair.

Figure 6:
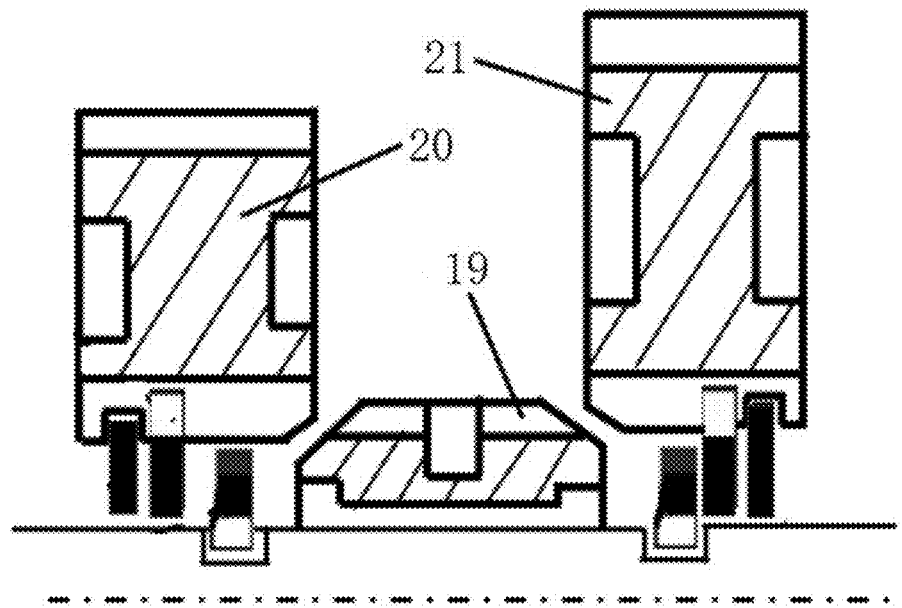
FIG. 6 is a schematic structural diagram of a first sliding sleeve shifting mechanism in the coaxial electric drive axle according to an embodiment of the present disclosure.

Specifically, referring to a schematic structural diagram of the first sliding sleeve shifting mechanism 13 shown in FIG. 6, the first sliding sleeve shifting mechanism 13 includes a sliding sleeve 19 which is sleeved on the shaft 7 through a spline, such that the sliding sleeve 19 can slide between the engaging tooth of the third gear 20 and the engaging tooth of the fourth gear 21. The outer surface of the sliding sleeve 19 is provided with an external tooth, and the inner surfaces of the third gear 20 and the fourth gear 21 are provided with internal teeth. When the sliding sleeve 19 slides to the position required for transmission, the external tooth of the sliding sleeve 19 can engage with the engaging teeth of the third gear 20 and the fourth gear 21 for power transmission. In order to meet the functions of traveling and parking brake, the housing of the axle housing should also have structures and interfaces for installing brakes, brake air chambers, mounting brackets and ABS sensor components.

In order to meet the load-bearing function, the electric drive axle needs to be connected with the frame, and the housing of the electric drive axle should have the structure and interface for installing the vehicle suspension system.

As can be seen from the above, the transmission system of the coaxial electric drive axle of the single-motor three-speed transmission commercial vehicle of the present disclosure adopts a three-speed design, and each functional module can be independent of each other, or can also be highly integrated. The three-speed transmission setting can optimally meet the requirements of speed ratio and power flow mode of electric drive axle of the electric commercial vehicles, and meet the balanced requirements of traction, vehicle speed and high operating efficiency of the commercial vehicles, especially the long-distance tractors.

In one embodiment of the present disclosure, the input power may come from a permanent magnet synchronous motor or a switched reluctance motor or an induction motor.

The present disclosure further provides an automobile, including the above-mentioned coaxial electric drive axle. It should be noted that the coaxial single-motor three-speed transmission system of the present disclosure can be applied to an electric drive axle assembly of a commercial vehicle, or be applied to the electric drive axles of other transportation vehicles with functions similar to those of an electric commercial vehicle.

To sum up, the coaxial electric drive axle of the single-motor three-speed transmission commercial vehicle of the present disclosure can choose to set different specific speed ratios according to different vehicles, different working conditions and loads, so as to achieve the optimal power and torque transmission of the vehicle, meet the requirements of the vehicle for traction, speed and efficiency, and achieve the lowest energy consumption requirements of the vehicle. The basic principles and main features of the present invention and the advantages of the present invention have been shown and described above.

Those skilled in the art should understand that the present disclosure is not limited by the above-mentioned embodiments, and the descriptions in the above-mentioned embodiments and the description are only used to illustrate the principle of the present disclosure. Without departing from the spirit and scope of the present disclosure, various changes and modifications of the present disclosure also fall within the claimed scope of the present disclosure.

The invention claimed is:

1. A coaxial electric drive axle, comprising a motor, at least one transmission assembly, a main shaft, and a first half shaft and a second half shaft connected by a differential; wherein,
the main shaft is fixedly connected with a housing of the differential, and the main shaft is sleeved on at least a part of the first half shaft and the second half shaft; the motor is rotationally connected to the at least one transmission assembly; when the coaxial electric drive axle is in a transmission mode, each transmission assembly is rotationally connected to the main shaft or the housing of the differential; each transmission assembly comprises at least two sliding sleeve shifting mechanisms, and at least one of the sliding sleeve shifting mechanisms is arranged on the housing of the differential, and at least one of the sliding sleeve shifting mechanisms is arranged on the main shaft; and
the motor, the main shaft, the first half shaft and the second half shaft have one same axis.

2. The coaxial electric drive axle according to claim 1, wherein a rotor of the motor has a through hole for the main shaft to pass through.

3. The coaxial electric drive axle according to claim 1, wherein each transmission assembly comprises at least three gear pairs;
when the coaxial electric drive axle is in a first transmission mode, the sliding sleeve shifting mechanism arranged on the housing of the differential is rotationally connected to a corresponding gear pair of the at least three gear pairs;
when the coaxial electric drive axle is in a second transmission mode, the sliding sleeve shifting mechanism arranged on the main shaft is rotationally connected to a corresponding gear pair of the at least three gear pairs; and
when the coaxial electric drive axle is in a neutral mode, each sliding sleeve shifting mechanism disconnects the transmission with corresponding gear pair.

4. The coaxial electric drive axle according to claim 1, wherein there are two transmission assemblies, and the two transmission assemblies are symmetrically arranged on both sides of the main shaft.

5. The coaxial electric drive axle according to claim 1, wherein each transmission assembly comprises a countershaft and at least three gear pairs, the countershaft comprises a first countershaft and a second countershaft, and at least one of the gear pairs is used for rotationally connecting the motor with the countershaft;
when the coaxial electric drive axle is in a first transmission mode, at least two gear pairs are used for rotationally connecting the countershaft with the housing of the differential; and
when the coaxial electric drive axle is in a second transmission mode, at least one gear pair is used for rotationally connecting the countershaft with the main shaft.

6. The coaxial electric drive axle according to claim 5, wherein each of the gear pairs comprises a first gear arranged on the countershaft and a second gear arranged on the main shaft or the housing of the differential, each first gear meshes with corresponding second gear.

7. The coaxial electric drive axle according to claim 6, wherein each second gear is arranged on the housing of the differential or the main shaft through a bearing.

8. The coaxial electric drive axle according to claim 5, further comprising a control unit electrically connected with the sliding sleeve shifting mechanism, the control unit is used for controlling the sliding sleeve shifting mechanism arranged on the housing of the differential to be rotationally connected with corresponding gear pair in the first transmission mode, controlling the sliding sleeve shifting mechanism arranged on the main shaft to be rotationally connected with corresponding gear pair in the second transmission mode; and controlling each sliding sleeve shifting mechanism to disconnect the transmission with corresponding gear pair in the neutral mode.

9. An automobile, comprising the coaxial electric drive axle according to claim 1.

10. The automobile according to claim 9, wherein a rotor of the motor has a through hole for the main shaft to pass through.

11. The automobile according to claim 9, wherein each transmission assembly comprises at least three gear pairs;
when the coaxial electric drive axle is in a first transmission mode, the sliding sleeve shifting mechanism arranged on the housing of the differential is rotationally connected to a corresponding gear pair of the at least three gear pairs;
when the coaxial electric drive axle is in a second transmission mode, the sliding sleeve shifting mechanism arranged on the main shaft is rotationally connected to a corresponding gear pair of the at least three gear pairs; and when the coaxial electric drive axle is in a neutral mode, each sliding sleeve shifting mechanism disconnects the transmission with corresponding gear pair.

12. The automobile according to claim 9, wherein there are two transmission assemblies, and the two transmission assemblies are symmetrically arranged on both sides of the main shaft.

13. The automobile according to claim 9, wherein each transmission assembly comprises a countershaft and at least three gear pairs, the countershaft comprises a first countershaft and a second countershaft, and at least one of the gear pairs is used for rotationally connecting the motor with the countershaft;

when the coaxial electric drive axle is in a first transmission mode, at least two gear pairs are used for rotationally connecting the countershaft with the housing of the differential; and when the coaxial electric drive axle is in a second transmission mode, at least one gear pair is used for rotationally connecting the countershaft with the main shaft.

14. The automobile according to claim 13, wherein each of the gear pairs comprises a first gear arranged on the countershaft and a second gear arranged on the main shaft or the housing of the differential, each first gear meshes with corresponding second gear.

15. The automobile according to claim 14, wherein each second gear is arranged on the housing of the differential or the main shaft through a bearing.

16. The automobile according to claim 13, wherein the coaxial electric drive axle further comprises a control unit electrically connected with the sliding sleeve shifting mechanism, the control unit is used for controlling the sliding sleeve shifting mechanism arranged on the housing of the differential to be rotationally connected with corresponding gear pair in the first transmission mode, controlling the sliding sleeve shifting mechanism arranged on the main shaft to be rotationally connected with corresponding gear pair in the second transmission mode; and controlling each sliding sleeve shifting mechanism to disconnect the transmission with corresponding gear pair in the neutral mode.

* * * * *